US012647792B2

(12) United States Patent
Koral et al.

(10) Patent No.: US 12,647,792 B2
(45) Date of Patent: **\*Jun. 2, 2026**

(54) CARRIER GRADE IDENTIFICATION OF SUBSCRIBER IDENTITY MODULE CARD-RELATED FRAUDULENT EVENTS

(71) Applicant: AT&T Intellectual Property I, L.P., Atlanta, GA (US)

(72) Inventors: Yaron Koral, Cherry Hill, NJ (US); Lauro Lins, Brooklyn, NY (US); Lukasz Grabarski, Duvall, WA (US)

(73) Assignee: AT&T Intellectual Property I, L.P., Atlanta, GA (US)

( \* ) Notice: Subject to any disclaimer, the term of this patent is extended or adjusted under 35 U.S.C. 154(b) by 3 days.

This patent is subject to a terminal disclaimer.

(21) Appl. No.: 18/773,444

(22) Filed: Jul. 15, 2024

(65) Prior Publication Data

US 2024/0373226 A1     Nov. 7, 2024

Related U.S. Application Data

(63) Continuation of application No. 17/482,640, filed on Sep. 23, 2021, now Pat. No. 12,041,453.

(51) Int. Cl.
*H04M 1/66*       (2006.01)
*H04W 12/12*      (2021.01)
*H04W 12/40*      (2021.01)

(52) U.S. Cl.
CPC .......... *H04W 12/12* (2013.01); *H04W 12/40* (2021.01)

(58) Field of Classification Search
CPC ..... H04W 12/35; H04W 12/72; H04W 12/40; H04W 12/02; H04W 12/12; H04W 12/122; H04W 12/126
See application file for complete search history.

(56) References Cited

U.S. PATENT DOCUMENTS

| | | | |
|---|---|---|---|
| 7,318,159 B2 * | 1/2008 | Salmivalli ........... | H04W 12/126 |
| | | | 455/410 |
| 11,582,610 B1 * | 2/2023 | Wolff .................. | H04W 12/122 |

\* cited by examiner

*Primary Examiner* — Shantell L Heiber

(57)       ABSTRACT

The disclosed technology is directed towards detecting suspected malicious activity involving mobile devices and subscriber identity module (SIM) cards, including discerning benign SIM swap events from likely malicious SIM swap events. In one example, call detail records, radio access network events and billing events are collected and analyzed to detect subscriber identity module swap events between mobile devices. Based on the collected data and related data sources SIM swap events are classified as benign or suspected malicious classifications. Malicious classifications can result in information representative of the suspected as malicious classification being output, e.g., as a type of fraudulent activity. A confidence level can be associated with classification output data, including for types of fraudulent activities and types of benign activities.

20 Claims, 10 Drawing Sheets

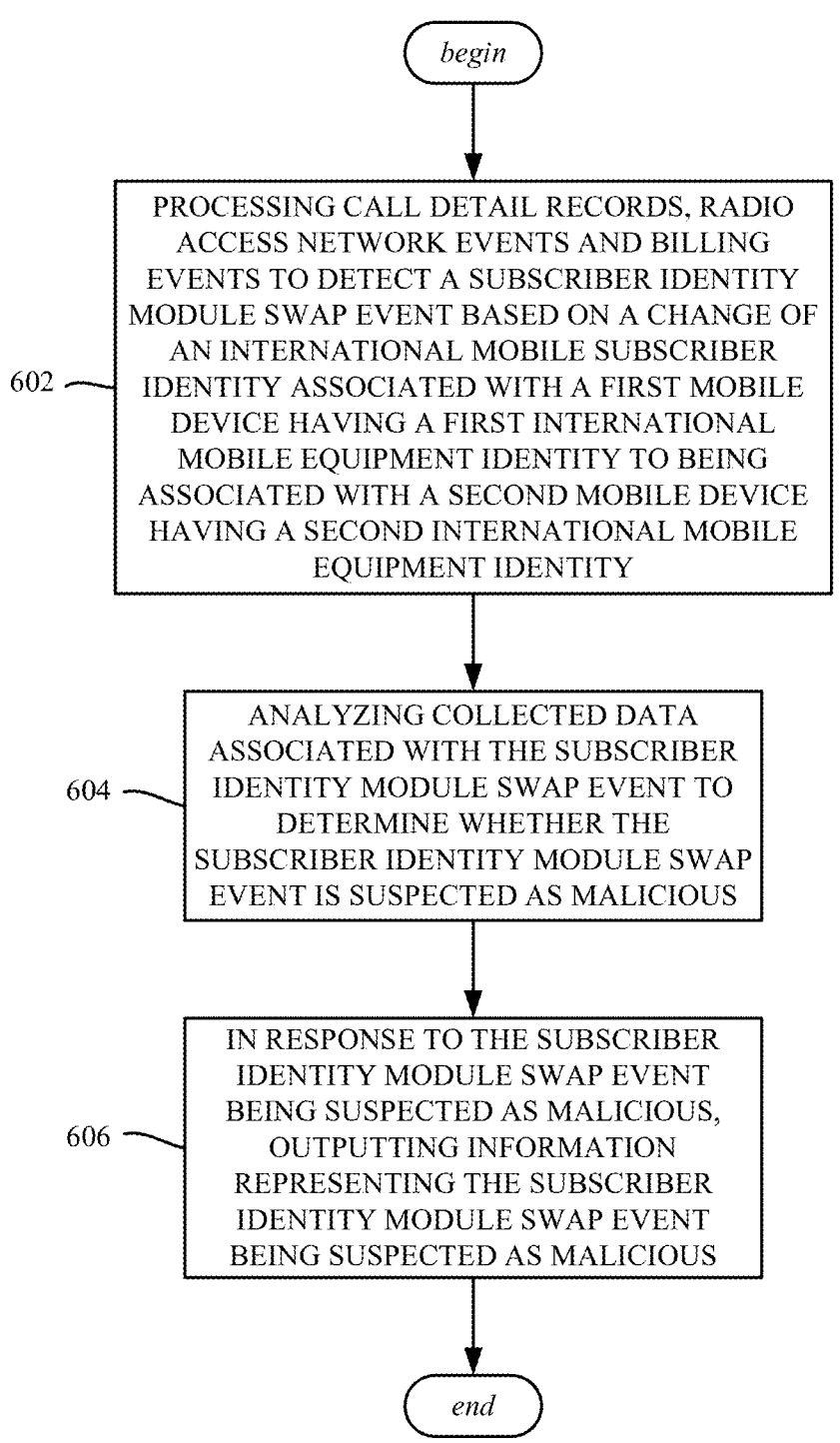

begin

602 — PROCESSING CALL DETAIL RECORDS, RADIO ACCESS NETWORK EVENTS AND BILLING EVENTS TO DETECT A SUBSCRIBER IDENTITY MODULE SWAP EVENT BASED ON A CHANGE OF AN INTERNATIONAL MOBILE SUBSCRIBER IDENTITY ASSOCIATED WITH A FIRST MOBILE DEVICE HAVING A FIRST INTERNATIONAL MOBILE EQUIPMENT IDENTITY TO BEING ASSOCIATED WITH A SECOND MOBILE DEVICE HAVING A SECOND INTERNATIONAL MOBILE EQUIPMENT IDENTITY

604 — ANALYZING COLLECTED DATA ASSOCIATED WITH THE SUBSCRIBER IDENTITY MODULE SWAP EVENT TO DETERMINE WHETHER THE SUBSCRIBER IDENTITY MODULE SWAP EVENT IS SUSPECTED AS MALICIOUS

606 — IN RESPONSE TO THE SUBSCRIBER IDENTITY MODULE SWAP EVENT BEING SUSPECTED AS MALICIOUS, OUTPUTTING INFORMATION REPRESENTING THE SUBSCRIBER IDENTITY MODULE SWAP EVENT BEING SUSPECTED AS MALICIOUS end

FIG. 6

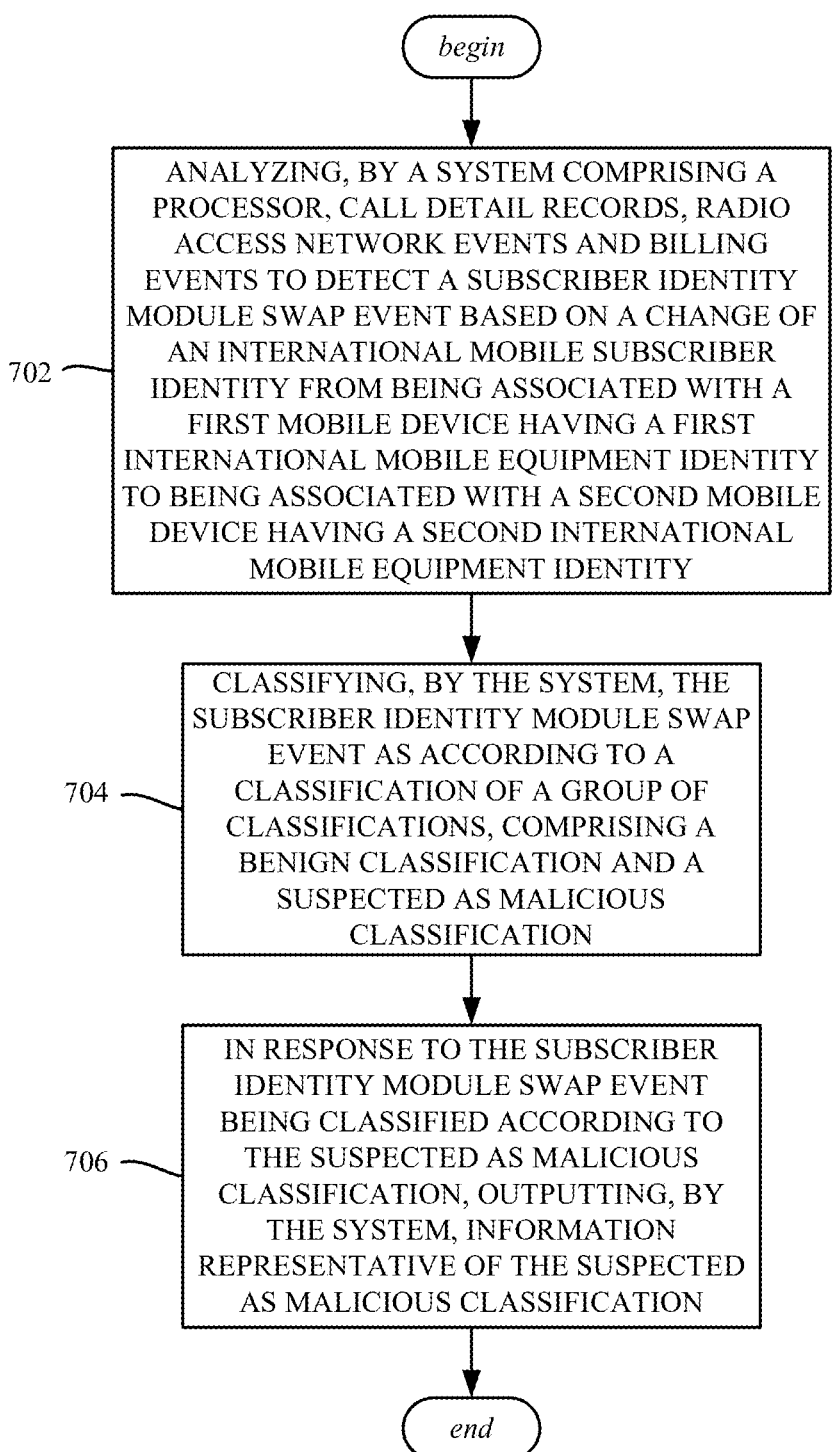

702 ANALYZING, BY A SYSTEM COMPRISING A PROCESSOR, CALL DETAIL RECORDS, RADIO ACCESS NETWORK EVENTS AND BILLING EVENTS TO DETECT A SUBSCRIBER IDENTITY MODULE SWAP EVENT BASED ON A CHANGE OF AN INTERNATIONAL MOBILE SUBSCRIBER IDENTITY FROM BEING ASSOCIATED WITH A FIRST MOBILE DEVICE HAVING A FIRST INTERNATIONAL MOBILE EQUIPMENT IDENTITY TO BEING ASSOCIATED WITH A SECOND MOBILE DEVICE HAVING A SECOND INTERNATIONAL MOBILE EQUIPMENT IDENTITY

704 CLASSIFYING, BY THE SYSTEM, THE SUBSCRIBER IDENTITY MODULE SWAP EVENT AS ACCORDING TO A CLASSIFICATION OF A GROUP OF CLASSIFICATIONS, COMPRISING A BENIGN CLASSIFICATION AND A SUSPECTED AS MALICIOUS CLASSIFICATION

706 IN RESPONSE TO THE SUBSCRIBER IDENTITY MODULE SWAP EVENT BEING CLASSIFIED ACCORDING TO THE SUSPECTED AS MALICIOUS CLASSIFICATION, OUTPUTTING, BY THE SYSTEM, INFORMATION REPRESENTATIVE OF THE SUSPECTED AS MALICIOUS CLASSIFICATION

MOBILE HANDSET

APPLICATIONS — 906

CLIENT (STORE, DISCOVERY, PLAY) — 946

908
FIRMWARE

938
TRIGGER COMPONENT 918     920
SUBSCRIBER IDENTITY SYSTEM

930
VIDEO COMP

936
HYSTERESIS COMPONENT

912
DISPLAY

940
SIP CLIENT

910
COMMUNICATION COMPONENT

911
CELL TCVR

913
WIFI TCVR

922
CAMERA

902
PROCESSOR

914
SERIAL I/O INTERFACE

904
MEMORY

932
LOCATION COMPONENT

935
USER INPUT

916
AUDIO I/O

924
POWER SOURCE

926
POWER I/O

CARRIER GRADE IDENTIFICATION OF SUBSCRIBER IDENTITY MODULE CARD-RELATED FRAUDULENT EVENTS

This application is a continuation of U.S. patent application Ser. No. 17/482,640, filed on Sep. 23, 2021, now U.S. Pat. No. 12,041,453, which is herein incorporated by reference in its entirety.

TECHNICAL FIELD

The subject application relates to wireless communications systems in general, and more particularly to detection of fraudulent mobile device activity.

BACKGROUND

For many people, the mobile device is a central place in which to maintain subscriber accounts, sensitive data, and credentials that grant access to the subscriber accounts. Identity theft and identity-related fraud are widespread these days. One tactic of attackers is to hijack the SIM (subscriber identity module or subscriber identification module) card in one way or another and impersonate the subscriber to gain access to sensitive accounts or perform malicious activities that victimize the subscriber.

In general, such malicious activities involve replicating SIM cards, spoofing the device identity, operating two or more devices with the same identity simultaneously, SIM swaps, and others. For example, a SIM swap allows someone else's mobile device to receive a two-factor authentication code that a financial institution believes it is sending to the mobile device of the correct customer, which thereby defeats two-factor authentication protection.

With the evolution of mobile devices to new radio (fifth generation and beyond), it is expected that a large number of Internet-of-Things (IoT) devices of different kinds will join the network. Malicious acts are becoming common for IoT devices as well; the identities of IoT devices provide attackers with access to cellular bandwidth that can be abused, and in some cases, allow attackers access to critical systems and infrastructure.

Identifying such cases without errors is challenging for a mobile carrier that serves on the order of hundreds of millions of devices. As the number of devices will grow significantly over the next five years, especially the number of IoT devices, this challenge is becoming even more difficult.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 6 is a flow diagram representing example operations related to analyzing a SIM swap event, in accordance with various aspects and embodiments of the subject disclosure.

FIG. 7 is a flow diagram representing example operations related to analyzing and classifying a SIM swap event, in accordance with various aspects and embodiments of the subject disclosure.

DETAILED DESCRIPTION

Figure 1:
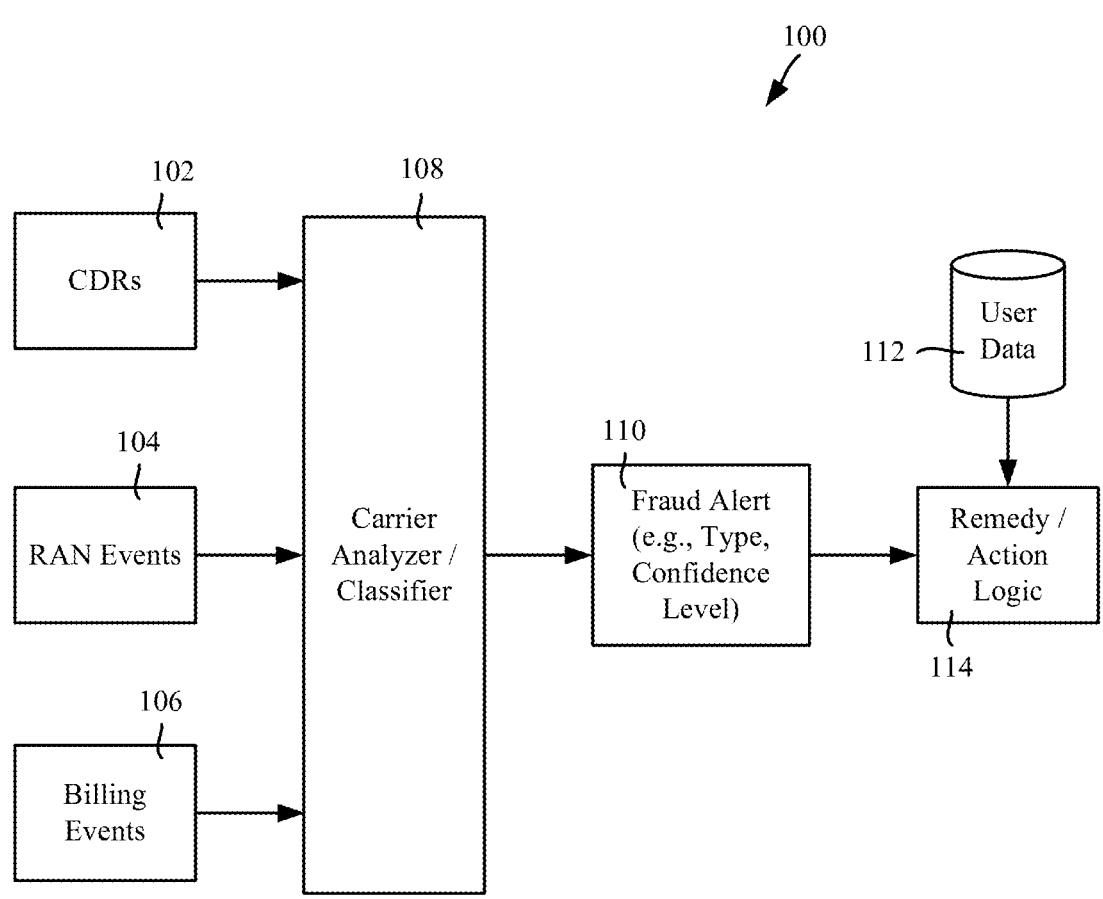
FIG. 1 is a block diagram illustrating an example wireless communication system configured to detect malicious SIM activities related to mobile devices, in accordance with various aspects and embodiments of the subject disclosure.

The technology described herein is generally directed towards a more efficient detection mechanism for SIM (subscriber identity module) card-related fraud events. As will be understood, various analyzers/classifiers components and data structures are described herein that facilitate more accurately discerning fraudulent SIM card-related events from false alarms that result from valid SIM card-related events.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in the example system 100 of FIG. 1, a cellular network carrier collects call detail records (CDRs) 102, radio access network (RAN) events 104 and billing events 106, which are analyzed and used in a classification process, represented in FIG. 1 by carrier analyzer/classifier 108, as described herein. The call detail records 102 are collected from many sources to help with the analysis and classification process. For example, the call detail records 102 indicate if a mobile device is roaming on a different network; such events are not visible from the RAN perspective because when roaming the subscriber uses the RAN of another carrier. With respect to the RAN events 104, RAN visibility provides insights about a device's location, and more granular events such as network registration and handover (movement between cells) of a mobile device. A third data source provides the billing events 106, which represent data from the cellular network carrier's billing systems. The billing events 106 provide a different perspective that complements the other two sources.

In general and as described herein, the carrier analyzer/ classifier 108 can output a fraud alert 110 or the like when a SIM card is swapped or otherwise misused; (e.g., when multiple devices use the same mobile subscriber identity to avoid payment for each device, which is one type of service fraud). Detecting these mobile identity theft events from a carrier perspective is challenging because the network serves many mobile devices, e.g., on the order of hundreds of millions. Although it is straightforward to detect a SIM swap between devices, for example, many such SIM swaps are entirely valid. Indeed, using a naive alert mechanism for any change of a device for a particular SIM card results in an extremely high percentage (e.g., over 99.9 percent) of false alarms. The fraud alert 110, which can include a classification type, and optionally a confidence level/score or the like, can be used to take some remedy or action. The remedy or action can be based on user data 112; e.g., a subscriber may pay for high security and prefer a fraud of a certain type/severity ranking at a certain confidence level to cause the device to be blocked as soon as possible, a corporate client can have an alert sent to its IT department to decide whether to shut down the compromised device, and so on. Severity of a type of fraud can be related to confidence levels; for example a less severely ranked type of event can require a higher confidence level before some action is taken, while a more severely ranked type of event can require a lower confidence level before some (possibly different) action is taken. The action taken, e.g., a notification by email, a text to an enterprise customer's IT department, a blocking of a type of service until the actual user contacts the carrier and so on can be a combination of customer type and/or preference, type of the malicious activity, and/or confidence level as to how certain the classifier is of a malicious versus benign activity.

In general, the technology described herein tracks two identity types for a device and subscriber, namely the International Mobile Subscriber ID (IMSI) and the International Mobile Equipment ID (IMEI). A carrier/mobile operator allocates the IMSI to a subscriber and identifies the subscriber over the cellular network. The IMSI plays a significant role in billing the subscriber, performing authentication procedures, and allocating services included in the subscriber's plan (such as voice, data plan, text messaging and the like). The device manufacturer assigns the IMEI; a first part of the IMEI uniquely identifies the vendor and model of the device, while the entire 15 digits of the IMEI uniquely identify the device instance.

Figure 2:
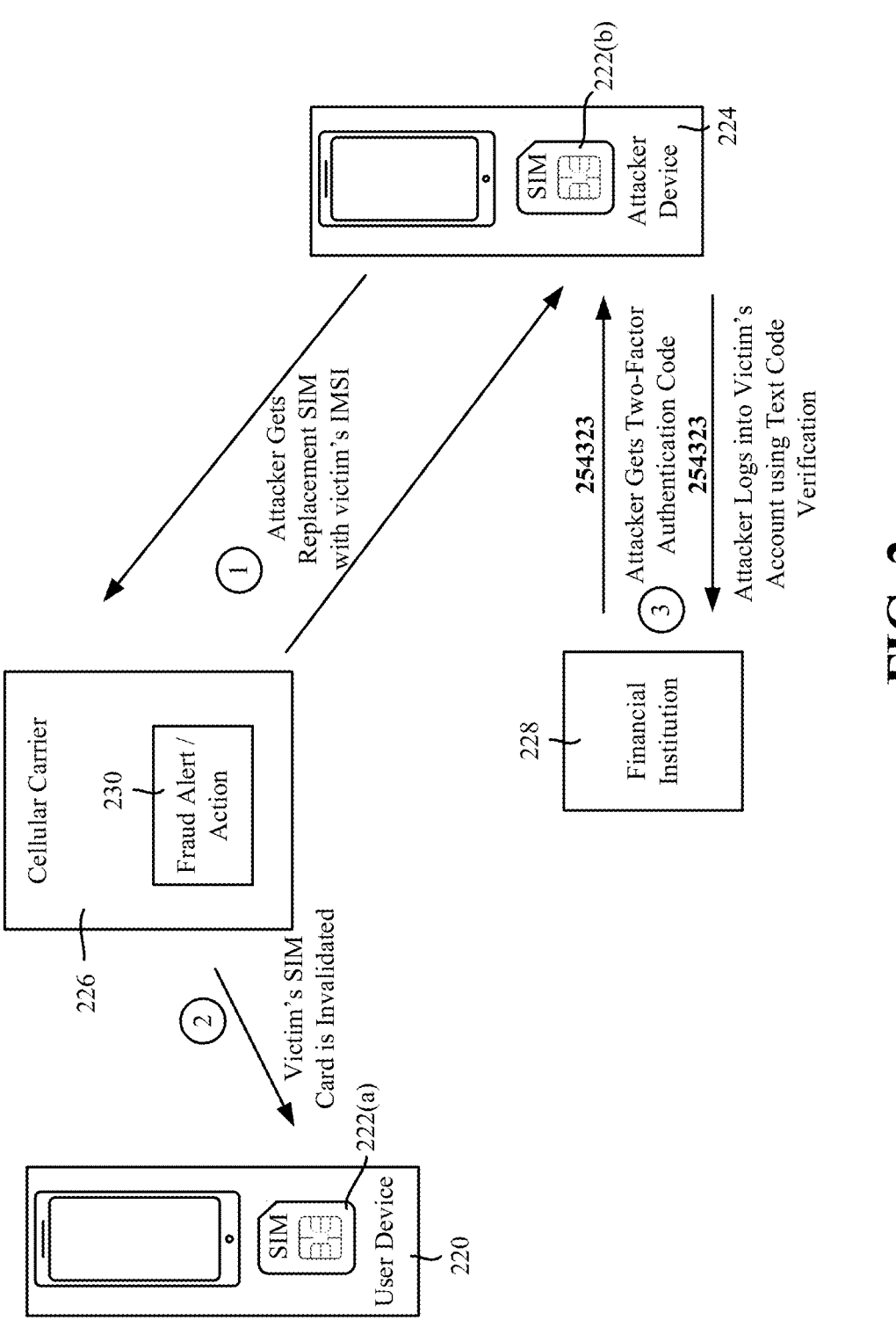
FIG. 2 is a representation of a typical fraudulent SIM swap example event and detection thereof, in accordance with various aspects and embodiments of the subject disclosure.

FIG. 2 shows an example of a typical malicious SIM swap event between a victim's user device 220 with a SIM card 222(a) and an attacker device 224 with a replacement SIM card 222(b). In a common scenario, the attacker knows a great deal about the victim's personal information, whereby the attacker impersonates the victim and convinces a mobile point of sale operator to issue the new SIM card 222(b) with the victim's identity, the IMSI, represented in FIG. 2 by the arrows labeled one (1). When the attacker obtains the new SIM card 222(b) with the victim's IMSI, the attacker uses the SIM card 222(b) with the attacker device 224. At the same time, the victim's SIM card 222(a) is disabled (arrow two (2)), and he or she loses connectivity to the services of the cellular carrier 226.

At this point, assume the attacker can separately access the victim's account in a financial institution 228 or the like (the attacker has stolen the victim's login username and password) by logging in and requesting access. Then, using text messaging back to the victim's phone (the well-known two-factor authentication procedure), as represented in FIG. 2 by the arrows labeled three (3), the attacker's device receives the requested SMS text message with a verification code, which the attacker then uses to gain access to the victim's account. When the victim identifies that he or she has no cellular service, which could be a long time before noticing, the victim will contact customer support, which will, in turn, reactivate the original SIM card 222(a); however the damage (e.g., draining funds from the bank account) is already done. This scenario is a classic event of identity theft.

A variant of the above scenario is when an attacker steals the identity of a stale account. In this case, the victim rarely uses their account, and it may take a long time before the victim reports the event. Other typical examples of account abuse, include, but are not limited to a duplicate identity where the attacker uses a victim's IMSI without deactivating the victim's SIM card, and service fraud, where an IoT service provider uses the same IMSI for many devices simultaneously, thus avoiding payments to the cellular operator.

If however a fraud alert 230 along with some corresponding action can be taken, such attacks can be thwarted. The straightforward approach to identify a SIM swap is to track all pairs of IMSI and IMEI and alert whenever the IMEI changes for a specific IMSI, however as set forth above, this is too all-encompassing, as many SIM swap events are valid resulting in a high percentage of false alarms. Thus, one aspect of the technology described herein is to separate suspected malicious SIM-related activity from likely benign SIM-related events.

Figure 3:
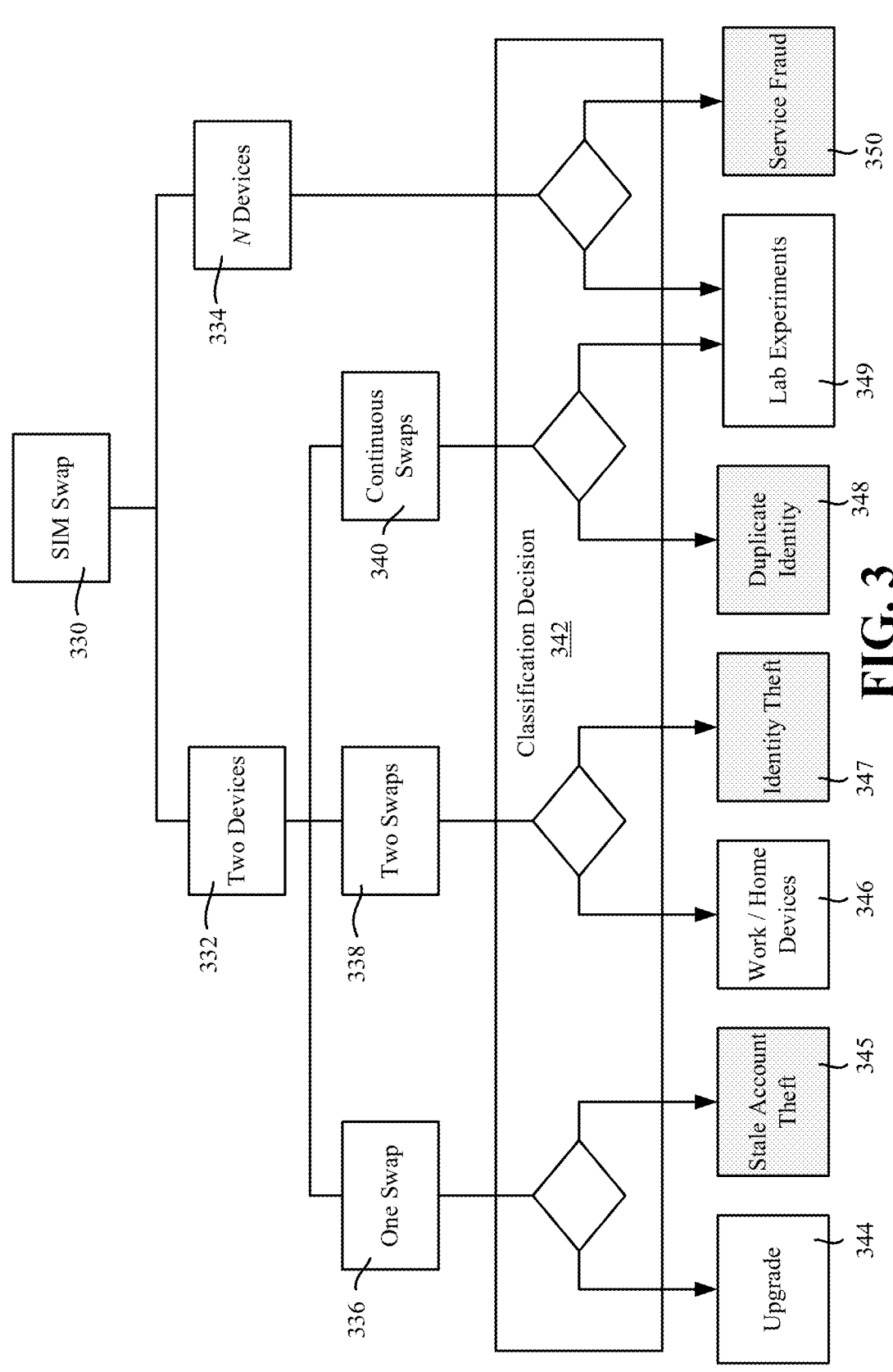
FIG. 3 is an example representation of possible classification types for a SIM swap event, in accordance with various aspects and embodiments of the subject disclosure.

FIG. 3 depicts a diagram that classifies a SIM swap event 330 as one of non-limiting examples described herein based on the number of devices (IMEI numbers) involved and the number of swaps detected. Two-device events 332 and N-device events 334 tend to represent different possible activities. Further, event among two-device events 332, there are different activities depending on whether a single "one-swap" event 336, two-swap events 338 (e.g., back-and-forth between two devices) or continuous (e.g., regular) swap events 340.

As can be seen in FIG. 3, one problem with a direct-numeric only approach is that the same events sometimes are malicious events (e.g., the events 345, 347, 348 and 350, generally described above) represented in FIG. 3 by shaded blocks, and for benign events 344, 346, and 349, represented by unshaded blocks. For example, a device upgrade event 344 or use of a SIM card for two devices (work device and personal device) events 346 are valid, benign uses of a SIM card. Other examples include lab experiments/testing by some device manufacturers who are allowed to reuse a test IMSI for many SIM cards, as well as device resellers that activate devices with a generic SIM before assigning the device to a subscriber.

The distinction between benign and malicious SIM swaps is thus a challenge, given that a very high percentage (generally more than 99 percent) of the changes of an IMEI for a single SIM are harmless. The technology applies a set of analyzers to inspect a SIM swap event such as the swap event SIM and make a classification decision (block 342). Based on the results, the system 100 (FIG. 1) can determine with some certainty if the swap is benign or malicious. For the latter case, the system can classify the type of hostile action.

Figure 4:
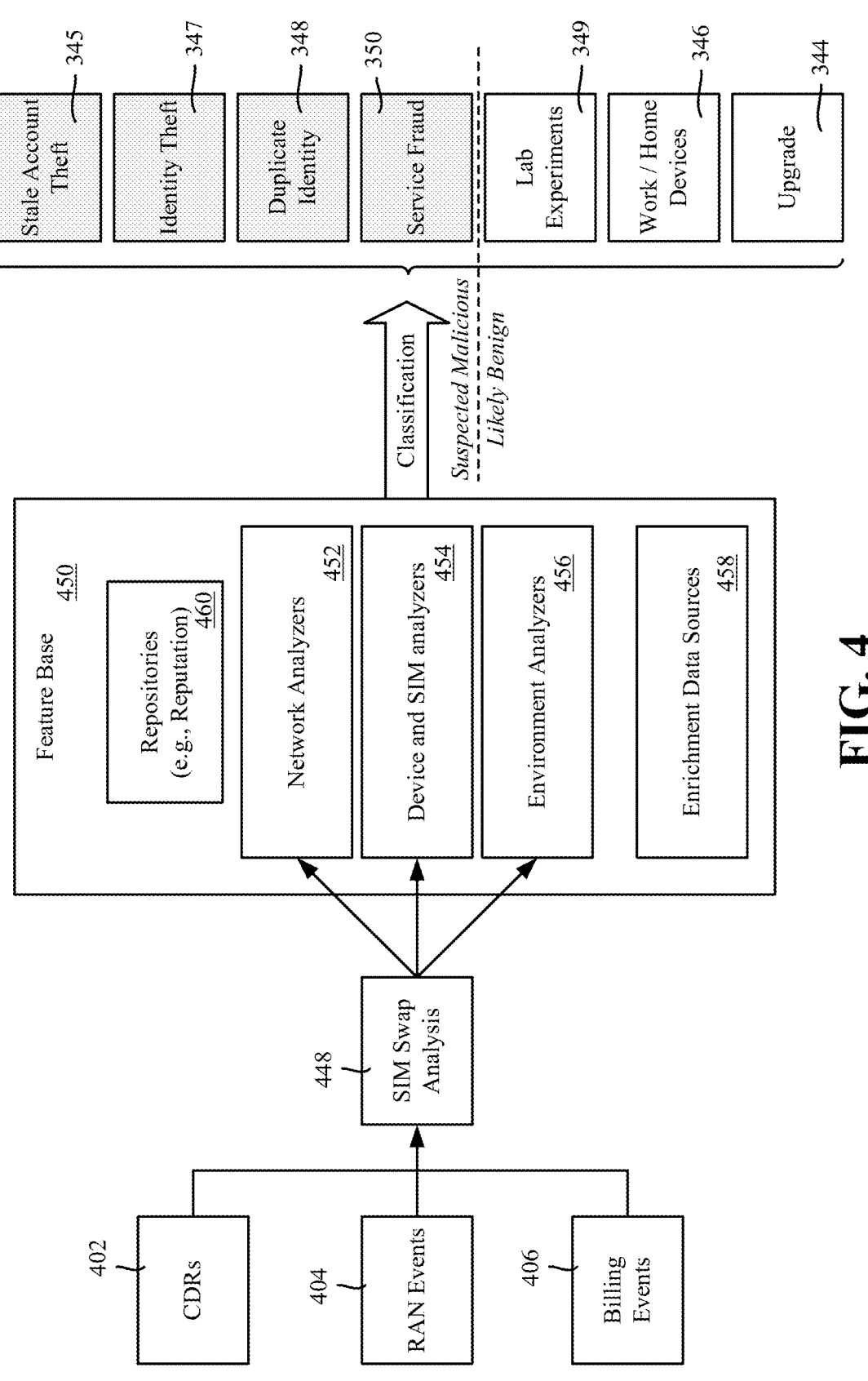
FIG. 4 is a block diagram representation of various example data sources, types of analyzers and data structures that are useable to classify SIM swap events, in accordance with various aspects and embodiments of the subject disclosure.

As shown in FIG. 1 and replicated to an extent in FIG. 4, the system can use a regular feed of events from three sources, namely call detail records (CDRs) 402, RAN events 404 and billing events 406. These three data sources have records with IMEI and IMSI numbers, but each has some additional helpful information elements.

In one implementation, a SIM swap analysis (block 448) uses multiple types of analyzers, including, but not limited to, network analyzers 452, device and SIM analyzers 454, and environment analyzers 456. Note that the device and SIM analyzers 454 are shown together in FIG. 4, however it is understood that any components in the example shown herein can be divided into a greater number of components, and similarly, any components in the example shown herein can be combined into a lesser number of components.

In general, the network analyzers 452 consider aspects such as the network slice or service used (for example, based on Access Point Name (APN)), whether the device was roaming, "teleporting" devices (devices that appear in different places at adjacent times), and network activity according to the time of the day the activity occurred. Each of these provides information that helps identify malicious activity versus benign activity.

The device and/or SIM analyzers 454 consider the type of the devices the SIM visited, the model of the devices, sequences of IMEIs used in the swap, and the availability of dual SIM or eSIM (a digital SIM rather than a physical SIM card) in the participating device models. As a simple example, it is more likely that a valid SIM swap corresponds to an upgrade from an older device to a newer device rather than a downgrade, which is more likely (although not necessarily) a malicious event.

The environment analyzers 456 identify cases where the swap was part of corruption of one of the collection feeds, a rare but known phenomenon in which the IMSI did not actually change but got corrupted to a different number in one or more event records. The environment analyzers 456 identify cases where the SIM swaps are part of routine lab tests or reseller phone activations.

The analyzers 452, 454 and 456 use a set of enrichment data sources 458. Such enrichment data sources 458 include, but are not limited to, cell tower locations, device model tables and SIM configuration per-device model.

The analyzers 452, 454 and 456 can maintain reputation repositories 460 based on the analysis each conducts. For example, one network-related reputation repository (e.g., maintained by the network analyzers 452) is a roaming reputation repository (or set of repositories). This repository represents other networks with a history of malicious SIM swaps, e.g., SIM cards from a particular country.

A device/SIM-related reputation repository (e.g., maintained by the device and/or SIM analyzers 454) includes a device-type reputation repository. For example, it may be the case that some "cheap" device models are more popular for SIM swaps of an identity theft event type.

Environment-related repositories (e.g., maintained by the environment analyzers 456) include, but are not limited to experimental SIM lists and reseller lab locations. In both cases, these repositories help remove false alarms resulting from a legitimate testing activity. The SIM swap analysis 448 uses the above sources and analyzers as features to a machine learning process of classification.

In this way, the SIM swap behavior, which may include a set of consecutive swaps, is classified to a set of SIM swap classes, some are benign (blocks 344, 346 and 349), while others are malicious (blocks 345*n* 347, 348 and 350), as shown in FIG. 3 and FIG. 4. Note that these classes are non-limiting, and additional classes that represents SIM swap use cases are detected which extend the model.

Figure 5:
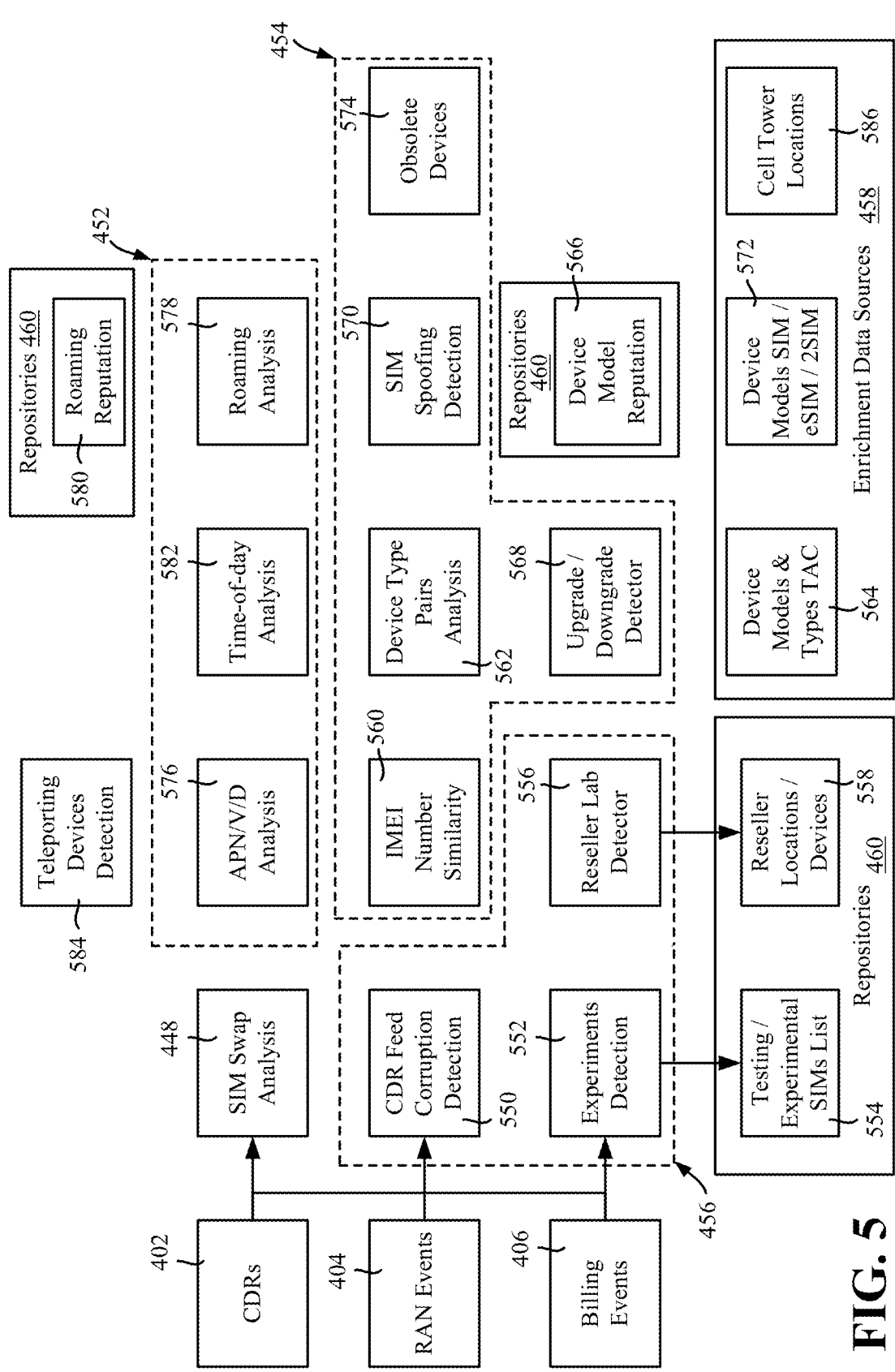
FIG. 5 is a block diagram representation of the various example data sources, internal analyzers and data structures corresponding to FIG. 4, for use in classifying SIM swap events, in accordance with various aspects and embodiments of the subject disclosure.

FIG. 5 depicts additional details and functionality of the above-described analyzers 452, 454 and 456 (with component analyzers shown in dashed blocks correspondingly labeled 452, 454 and 456). FIG. 5 also shows examples of individual repositories of the set of repositories 460 of FIG. 4, and examples of individual data sources of the set of enrichment data sources 458 of FIG. 4.

In FIG. 5, a CDR feed corruption detection analyzer 550 (one of the analyzers of the environment analyzers 456) analyzes false alarms that result from a corruption of one of the CDR feeds, where the CDR repository represents records 402 collected from tens of different sources. Note that records are collected for any operating cellular generations of equipment (i.e., 3G, LTE, 5G, etc.). Such sources include sources from the user plane as well as the control plane. CDR feeds also include feeds from roaming interfaces and management interfaces. Further note that the same transaction may result in multiple occurrences from different feeds. A rare phenomenon is that one of the feeds corrupts the IMEI number, e.g., an IMEI of "12345678 . . . " in one feed may be corrupted to appear as "21436587 . . . " in a different feed. Note that such feeds may corrupt a few IMEIs while reporting most of the IMEIs correctly, whereby it is challenging to identify these rare cases. In such situations, it appears that the same IMSI keeps switching IMEI numbers for an extended period. A naive approach would be to generate thousands of SIM swap alerts between these two IMSI numbers, while in fact, there is only one device with one SIM card. The CDR feed corruption detection analyzer 550 correlates feed ID with repeating swaps as well as performs analysis of IMEI number structure. When the CDR feed corruption detection analyzer 550 detects a corrupted feed, it tags the swaps as false alarms and can update a feed reputation data store (not explicitly shown in FIG. 5) for helping future such detections.

In another scenario, device experiments and equipment testing are part of a routine operation of a mobile carrier, as well as some mobile carrier customers who apply mobile carrier services (such as car manufacturers, enterprises, and IoT devices providers). To conduct these experiments, the mobile carrier issues testing SIM cards and in some cases allow the use of the same IMSI for multiple SIM cards. These cases are detected as SIM swaps, but are valid use cases that otherwise generate false alarms. However, while these IMSI allocated to experiments are documented, there are many cases in that updates are not current. As such, a devices experiments detector 552 is applied. For example, the detector 552 can use machine learning techniques to identify locations where abnormal duplicate IMSI events occur. Over time these findings are stored in a testing/experimental SIM list repository 554.

Another one of the environment analyzers 456 comprises a reseller location detector 556. Note that resellers of mobile equipment tend to use a set of SIM cards to activate or test mobile devices, such as mobile phones, mobile hot spots, security cameras, and the like. The reseller location detector 556 classifies a behavior where a small set of SIM cards in the exact location are used over different devices on a regular basis. Also, these devices eventually end up with another SIM for the long term (the SIM allocated to the subscriber). These reseller store locations and the SIM cards they use are maintained in one of the repositories 460, (e.g. in a reseller locations/devices repository 558) for further classification of other swaps.

Turning to the category of device and/or SIM analyzers 454, in one implementation an IMEI number similarity detector 560 looks for cases in which a SIM card switches several devices, where the IMEI numbers of these devices are sequential or very similar. The detector 560 uses pattern similarity recognition, as such detection of patterns increases the probability that these SIM swaps are benign and are part of some experiment/testing by a device manufacturer. More particularly, this pattern typically characterizes a quality check process for new devices.

A device type pairs analysis subsystem 562 obtains the type of cellular device from an enrichment data source 564/repository that contains information about the different device models based on their Type Allocation Code (TAC), the first eight digits of the IMEI. Examples of device types include smartphone, mobile hot spot, security camera, connected car, wearable device, trackers, and so on. Some type-pair swaps are more likely to be benign, while others are more likely to be malicious. For example, smartphone-to-mobile hot spot swaps are more plausible (although some cases are fraud). Conversely, any swap that involves a connected car with some other type is less likely valid, because the SIM card for connected cars is often molded to the car's modem. Using the mobile device types as a feature allows the subsystem 562 to learn what device-type pairs are more susceptible to malicious use and the class of hostile acts.

Device model reputation (block 566) is another feature that can be learned and maintained (e.g., by the device type pairs analysis subsystem 562) in a repository or the like. The device model acts as a feature in the classification process, based on the observation that certain models are used more in malicious swap transactions. These models are usually cheaper and are often manufactured by companies with lesser reputations. This feature does not determine if the swap was malicious or not; instead, it adds certainty (a confidence level) to the final classification decision one way or another.

An upgrade/downgrade detector/analyzer 568 provides insight into the swap classification by analyzing the likelihood of a device upgrade. For example, if a device model changed from version 8 to version 11, this may indicate that the IMSI changed phones as part of an upgrade. On the other hand, if the transaction were reversed, it indicates a phone downgrade, which is less likely. The analyzer 568 takes into account information from the devices models and types enrichment data source 564. Logic is applied based on an increase in TAC numbers for new models of the same manufacturer.

SIM spoofing is detected by a SIM spoofing analyzer 570, which ties information from the device setup regarding its support of eSIM, dual SIM, or unlocked device; (block 572, where an eSIM is an embedded SIM, where the manufacturer digitally integrates a SIM card inside the device). The eSIM can be activated remotely by the carrier and has been part of several known fraud schemes. Dual-SIM devices may confuse the detection system when two SIM cards may be associated with one device. The output of the SIM spoofing analyzer 570 analyzer adds features to the overall SIM swap classification process.

Obsolete device detection (block 574) is based on the fact that some older mobile device models do not support 4G/LTE (fourth generation/long term evolution) or newer network generations (e.g., fifth generation), and, for example, only support up to third generation (3G). When observing LTE network events there are many such obsolete devices that appear to generate LTE traffic, for example. Thus, when their IMEIs appear in the LTE network, the main explanation is that these devices use spoofed IMEI numbers. Having a SIM swap that involves such an 'obsolete device' raises the probability that the transaction is malicious.

With respect to the category of network analyzers 452, an APN analysis (block 576, Access Point Name, including voice V and data D) identifies the type of service a device uses. There are general APNs for each carrier, such as the voice, data, or e911 APNs. Furthermore, there are dedicated services to customers who require private dedicated channels, such as connected car services, mobile hotspot providers, security camera services, and more. Many times, the configuration of the available APNs is stored in the SIM card. APN analysis 574 uncovers mismatches between phone type and subscriber types concerning the configured APN. For example, an attacker may use a SIM card to steal an identity, but the SIM card contains some historical configuration of a unique APN. Analysis of the APNs from the registration process sometimes can provide significant insights for the classification process.

A roaming analysis (block 578) is based on evaluating when a roaming device is getting service from a cellular network (visiting network) different than the one to which it is subscribed (home network). The visiting and the home networks have visibility to the device activity since the visiting network queries the home network for policies and authentication of the visiting device. Therefore, a cellular carrier can observe SIM swaps of its subscribers roaming on other networks or visiting devices connected to its network, which are subscribers of other networks. The fact that a device is roaming in either one of the cases can be a significant feature that helps the classification process. For example, it is less likely that someone who travels will upgrade their phone to a device registered to their home carrier. Another significant feature is the reputation of the other network involved in roaming, e.g., maintained in a repository 580. It is well known that some countries or small carriers are more likely to be involved in malicious acts than others.

Time-of-day analysis (block 582) is based on the time of the swap transaction, which is another useful feature to help the correct classification process. For example, abnormal transactions often happen during the night. Another use of time-of-day analysis 582 is to reveal periodic patterns such as regular experiments, or daily routines of switching devices (e.g., a user done with work swaps a SIM card from a work device to a home device, and vice-versa before starting work)

Teleporting devices detection, represented by block 584, refers to observing an IMSI in two different locations in a period that makes travel impossible. For example, an IMSI that is in Florida at 10:01 AM appears in California at 10:02 AM. Teleporting, which can be based to an extent on cell tower locations 586, helps in ruling out the classification of an 'upgrade' or 'fix' to the device, because such events are highly likely to happen in the exact location.

One or more example aspects are represented in FIG. 6, and can correspond to a system, comprising a processor, and a memory that stores executable instructions that, when executed by the processor, facilitate performance of operations. Example operation 602 represents processing call detail records, radio access network events and billing events to detect a subscriber identity module swap event based on a change of an international mobile subscriber identity associated with a first mobile device having a first international mobile equipment identity to being associated with a second mobile device having a second international mobile equipment identity. Operation 604 represents analyzing collected data associated with the subscriber identity module swap event to determine whether the subscriber identity module swap event is suspected as malicious. Operation 606 represents in response to the subscriber identity module swap event being suspected as malicious, outputting information representing the subscriber identity module swap event being suspected as malicious.

Outputting the information representing the subscriber identity module swap event being suspected as malicious can include outputting a classification type representing a malicious type of event. The classification type can indicate at least one of: a first type representative of a stale account theft, a second type representative of an identity theft, a third type representative of a duplicate identity activity, or a fourth type representative of a service fraud.

Outputting of the information representing the subscriber identity module swap event being suspected as malicious can include outputting a confidence level value.

Further operations can include, in response to the subscriber identity module swap event being determined to be benign, outputting a classification type. The classification type can indicate at least one of: a first type representative of an experimental use, a second type representative of an upgrade, or a third type representative of a swap between mobile devices associated with a same user.

Analyzing the data associated with the subscriber identity module swap event can include inputting network-related data of the collected data to a network analyzer that evaluates at least one of: a first network slice used by the first mobile device, a second network slice used by the second mobile device, a first service used by the first mobile device, a second service used by the second mobile device, whether the first mobile device was roaming, whether the second mobile device was roaming, whether the first mobile device and the second mobile device were connected in different locations at adjacent times, first network activity of the first mobile device in association with a first time of the day, or second network activity the second mobile device in association with a second time of the day.

Analyzing the data associated with the subscriber identity module swap event can include inputting device-related data and subscriber identity module-related data of the collected data to a device and subscriber identity module analyzer that evaluates at least one of: a first type of the first mobile device, a second type of the second mobile device, a first model of the first mobile device, a second model of the second mobile device, a numeric relationship between the first international mobile equipment identity and the second international mobile equipment identity, first availability of dual subscriber identity modules in the first mobile device, second availability of dual subscriber identity modules in the second mobile device, third availability of a digital subscriber identity module in the first mobile device, or fourth availability of a digital subscriber identity module in the second mobile device.

Analyzing of the data associated with the subscriber identity module swap event can include inputting environment-related data of the collected data to an environment analyzer that evaluates at least one of: whether the subscriber identity module swap event resulted from corruption of the data associated with the subscriber identity module swap event, whether the subscriber identity module swap event is related to experimental testing, or whether the subscriber identity module swap event is related to a reseller phone activation.

Analyzing of the data associated with the subscriber identity module swap event can include at least one of inputting network-related data of the collected data to a network analyzer, inputting device-related data of the collected data to a device analyzer, inputting subscriber identity module-related data of the collected data to a subscriber identity module analyzer, or inputting environment-related data of the collected data to an environment analyzer.

At least one of the network analyzer, the device analyzer, the subscriber identity module analyzer, or the environment analyzer can be coupled to an enrichment data source. The enrichment data source can maintain information of at least one of: a cell tower location data structure, a device model information data structure, or a subscriber identity module configuration per-device model data structure.

At least one of the network analyzer, the device analyzer, the subscriber identity module analyzer, or the environment analyzer can be maintain a repository for use in subsequent analyses.

One or more example aspects are represented in FIG. 7, and can correspond to example operations, e.g., of a method. Operation 702 represents analyzing, by a system comprising a processor, call detail records, radio access network events and billing events to detect a subscriber identity module swap event based on a change of an international mobile subscriber identity from being associated with a first mobile device having a first international mobile equipment identity to being associated with a second mobile device having a second international mobile equipment identity. Operation 704 represents classifying, by the system, the subscriber identity module swap event as according to a classification of a group of classifications, comprising a benign classification and a suspected as malicious classification. Operation 706 represents, in response to the subscriber identity module swap event being classified according to the suspected as malicious classification, outputting, by the system, information representative of the suspected as malicious classification.

Outputting the information representative of the classifying can include outputting a confidence level score.

Outputting the information representative of the classifying can include outputting a type of fraudulent activity.

Classifying the subscriber identity module swap event can include obtaining network-related data associated with the subscriber identity module swap for input to a network analyzer, obtaining device-related data associated with the subscriber identity module swap for input to a device analyzer, obtaining subscriber identity module-related data associated with the subscriber identity module swap for input to a subscriber identity module analyzer, and obtaining environment-related data associated with the subscriber identity module swap for input to an environment analyzer.

Figure 8:
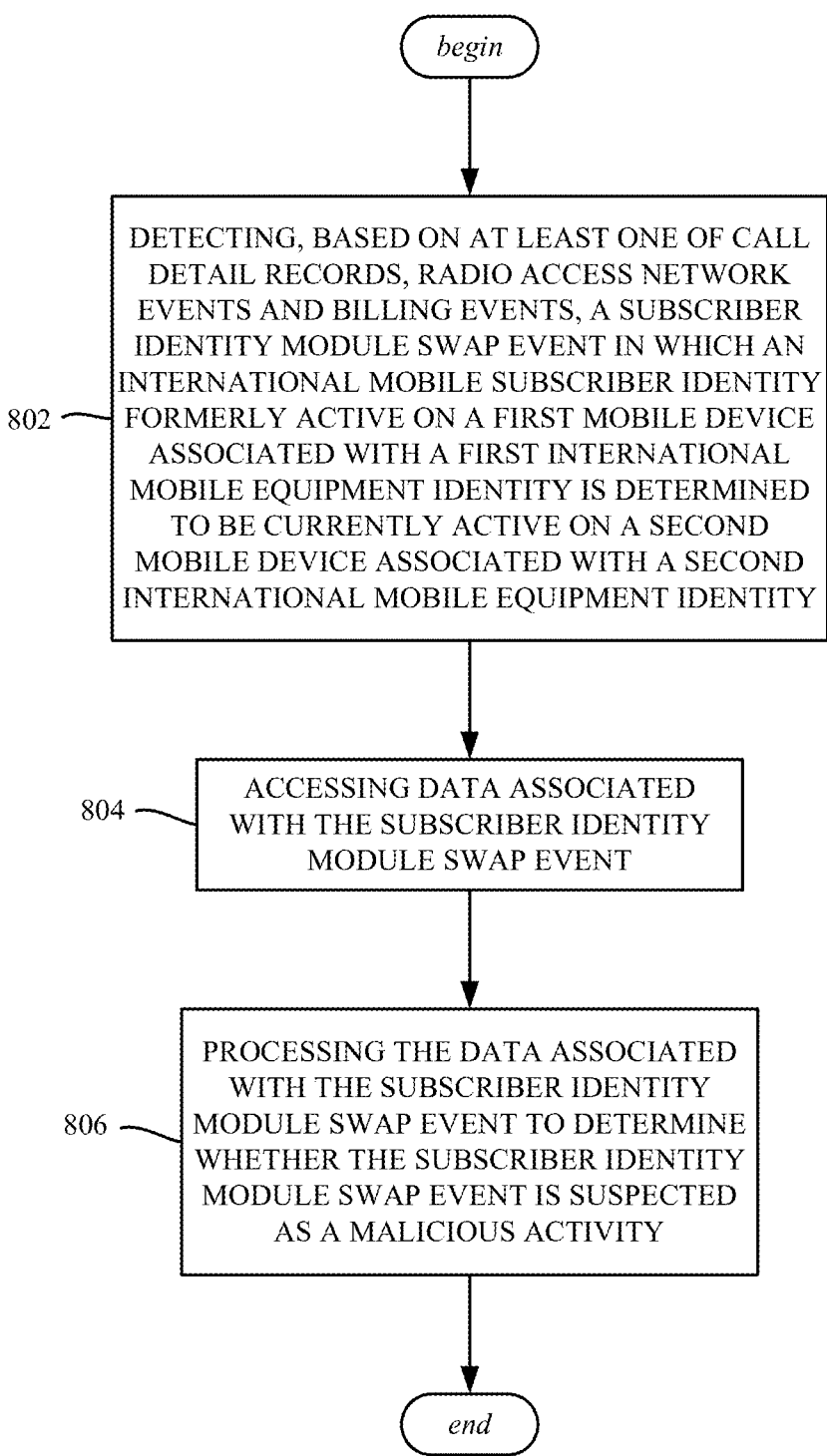
FIG. 8 is a flow diagram representing example operations related to processing data associated with a SIM swap event to determine whether the event is suspected as a malicious activity, in accordance with various aspects and embodiments of the subject disclosure.

One or more aspects are represented in FIG. 8, such as implemented in a machine-readable medium, comprising executable instructions that, when executed by a processor, facilitate performance of operations. Example operation 802 represents detecting, based on at least one of call detail records, radio access network events and billing events, a subscriber identity module swap event in which an international mobile subscriber identity formerly active on a first mobile device associated with a first international mobile equipment identity is determined to be currently active on a second mobile device associated with a second international mobile equipment identity. Operation 804 represents accessing data associated with the subscriber identity module swap event. Operation 806 represents processing the data associated with the subscriber identity module swap event to determine whether the subscriber identity module swap event is suspected as a malicious activity.

Processing of the data associated with the subscriber identity module swap event can include accessing at least one of: a reputation repository, a roaming reputation repository, a device reputation repository, a subscriber identity module-related reputation repository, an environment-related repository an experimental repository, or a device model and device type repository.

Processing of the data associated with the subscriber identity module swap event can include accessing at least one of: a cell tower location data structure, a device model information data structure, or a subscriber identity module configuration per-device model data structure.

As can be seen, the technology described herein identifies anomalies in a mobility network, including malicious events that involve mobile devices and subscribers due to SIM swaps and other SIM-related activities. The technology described herein provides significant value in uncovering a variety of fraudulent scenarios. The technology scales well, which is significant because it is expected that a large number of IoT devices of different kinds will join the network. This enormous increase in capacity and variety benefits from technology that detects abnormal fraudulent activities.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 9:
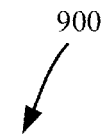
FIG. 9 illustrates an example block diagram of an example mobile handset operable to engage in a system architecture that facilitates wireless communications according to one or more embodiments described herein.

Referring now to FIG. 9, illustrated is a schematic block diagram of an example end-user device (such as user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM)

or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
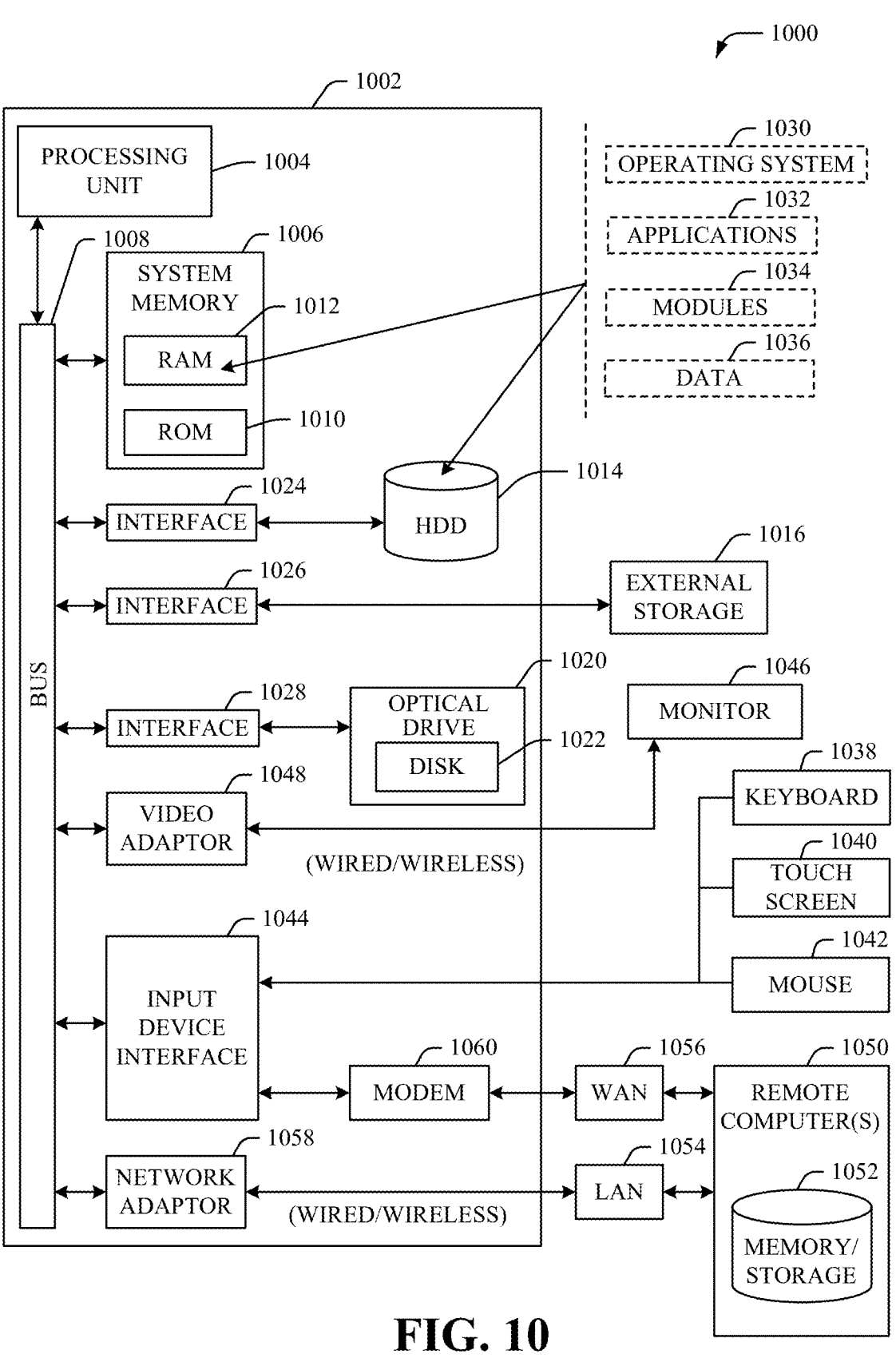
FIG. 10 illustrates an example block diagram of an example computer/machine system operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD), non-volatile memory and other storage technology could be used in addition to, or in place of, an HDD 1014, and can be internal or external. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 994 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/ storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system comprising:
a processor; and
a memory that stores executable instructions that, when executed by the processor of the system, facilitate performance of operations, the operations comprising:
processing call detail records and radio access network events to detect a subscriber identity module swap event based on a change of an international mobile subscriber identity associated with a first mobile device having a first international mobile equipment identity to being associated with a second mobile device having a second international mobile equipment identity;
analyzing collected data associated with the subscriber identity module swap event to determine whether the subscriber identity module swap event is malicious, wherein the analyzing comprises determining a classification type of the subscriber identity module swap event from among a plurality of classification types including at least two of: a first type representative of a stale account theft, a second type representative of an identity theft, a third type representative of a duplicate identity activity, or a fourth type representative of a service fraud; and
in response to the subscriber identity module swap event being determined to be malicious, outputting information representing the subscriber identity module swap event being malicious, wherein the outputting of the information representing the subscriber identity module swap event being malicious comprises outputting the classification type.

2. The system of claim 1, wherein the classification type represents a malicious type of event.

3. The system of claim 1, wherein the outputting of the information representing the subscriber identity module swap event being malicious comprises outputting a confidence level value.

4. The system of claim 1, wherein the analyzing of the collected data associated with the subscriber identity module swap event comprises inputting network-related data of the collected data to a network analyzer that evaluates at least one of: a first network slice used by the first mobile device, a second network slice used by the second mobile device, a first service used by the first mobile device, a second service used by the second mobile device, whether the first mobile device was roaming, whether the second mobile device was roaming, whether the first mobile device and the second mobile device were connected in different locations at adjacent times, a first network activity of the first mobile device in association with a first time of a day, or a second network activity of the second mobile device in association with a second time of the day.

5. The system of claim 1, wherein the analyzing of the collected data associated with the subscriber identity module swap event comprises inputting device-related data and subscriber identity module-related data of the collected data to a device and subscriber identity module analyzer that evaluates at least one of: a first type of the first mobile device, a second type of the second mobile device, a first model of the first mobile device, a second model of the second mobile device, a numeric relationship between the first international mobile equipment identity and the second international mobile equipment identity, a first availability of dual subscriber identity modules in the first mobile device, a second availability of dual subscriber identity modules in the second mobile device, a third availability of a digital subscriber identity module in the first mobile device, or a fourth availability of a digital subscriber identity module in the second mobile device.

6. The system of claim 1, wherein the analyzing of the collected data associated with the subscriber identity module swap event comprises inputting environment-related data of the collected data to an environment analyzer that evaluates at least one of: whether the subscriber identity module swap event resulted from a corruption of the collected data associated with the subscriber identity module swap event, whether the subscriber identity module swap event is related to an experimental testing, or whether the subscriber identity module swap event is related to a reseller phone activation.

7. The system of claim 1, wherein the analyzing of the collected data associated with the subscriber identity module swap event comprises at least one of: inputting network-related data of the collected data to a network analyzer, inputting device-related data of the collected data to a device analyzer, inputting subscriber identity module-related data of the collected data to a subscriber identity module analyzer, or inputting environment-related data of the collected data to an environment analyzer.

8. The system of claim 7, wherein at least one of: the network analyzer, the device analyzer, the subscriber identity module analyzer, or the environment analyzer is coupled to an enrichment data source.

9. The system of claim 8, wherein the enrichment data source maintains information of at least one of: a cell tower location data structure, a device model information data structure, or a subscriber identity module configuration per-device model data structure.

10. The system of claim 7, wherein at least one of: the network analyzer, the device analyzer, the subscriber identity module analyzer, or the environment analyzer maintain a repository for use in subsequent analyses.

11. A method comprising:

processing, by a system comprising a processor, call detail records and radio access network events to detect a subscriber identity module swap event based on a change of an international mobile subscriber identity from being associated with a first mobile device having a first international mobile equipment identity to being associated with a second mobile device having a second international mobile equipment identity;

classifying, by the system, the subscriber identity module swap event according to a classification of a group of classifications, the group of classifications comprising a benign classification and a malicious classification, wherein the classifying comprises determining a classification type of the subscriber identity module swap event from among a plurality of classification types including at least two of: a first type representative of a stale account theft, a second type representative of an identity theft, a third type representative of a duplicate identity activity, or a fourth type representative of a service fraud; and in response to the subscriber identity module swap event being classified according to the malicious classification, outputting, by the system, information representative of the malicious classification, wherein the outputting of the information representative of the malicious classification comprises outputting the classification type.

12. The method of claim 11, wherein the outputting of the information representative of the malicious classification comprises outputting a confidence level score.

13. The method of claim 11, wherein the outputting of the information representative of the malicious classification comprises outputting a type of fraudulent activity.

14. The method of claim 11, wherein the classifying of the subscriber identity module swap event comprises obtaining network-related data associated with the subscriber identity module swap event for input to a network analyzer, obtaining device-related data associated with the subscriber identity module swap event for input to a device analyzer, obtaining subscriber identity module-related data associated with the subscriber identity module swap event for input to a subscriber identity module analyzer, and obtaining environment-related data associated with the subscriber identity module swap event for input to an environment analyzer.

15. The method of claim 11, wherein the classification type represents a malicious type of event.

16. A non-transitory machine-readable medium, comprising executable instructions that, when executed by a processor, facilitate performance of operations, the operations comprising:

detecting, based on call detail records and radio access network events, a subscriber identity module swap event in which an international mobile subscriber identity formerly active on a first mobile device associated with a first international mobile equipment identity is determined to be currently active on a second mobile device associated with a second international mobile equipment identity;

accessing data associated with the subscriber identity module swap event;

processing the data associated with the subscriber identity module swap event to determine whether the subscriber identity module swap event is malicious, wherein the processing comprises determining a classification type of the subscriber identity module swap event from among a plurality of classification types including at least two of: a first type representative of a stale account theft, a second type representative of an identity theft, a third type representative of a duplicate identity activity, or a fourth type representative of a service fraud; and in response to the subscriber identity module swap event being determined to be malicious, outputting information representing the subscriber identity module swap event being malicious, wherein the outputting of the information representing the subscriber identity module swap event being malicious comprises outputting the classification type.

17. The non-transitory machine-readable medium of claim 16, wherein the processing of the data associated with the subscriber identity module swap event comprises accessing at least one of: a reputation repository, a roaming reputation repository, a device reputation repository, a subscriber identity module-related reputation repository, an environment-related repository, an experimental repository, or a device model and device type repository.

18. The non-transitory machine-readable medium of claim 16, wherein the processing of the data associated with the subscriber identity module swap event comprises accessing at least one of: a cell tower location data structure, a device model information data structure, or a subscriber identity module configuration per-device model data structure.

19. The non-transitory machine-readable medium of claim 16, wherein the outputting of the information representing the subscriber identity module swap event being malicious comprises outputting a confidence level value.

20. The non-transitory machine-readable medium of claim 16, wherein the classification type represents a malicious type of event.

* * * * *